US012359497B1

(12) United States Patent
Yates

(10) Patent No.: US 12,359,497 B1
(45) Date of Patent: Jul. 15, 2025

(54) BARRIER SYSTEM WITH INDEPENDENT FENCE AND GATE MODULES

(71) Applicant: 3D GLOBAL PTY LTD, Murarrie (AU)

(72) Inventor: Jamie Yates, Murarrie (AU)

(73) Assignee: 3D Global Pty Ltd, Murarrie (AU)

( * ) Notice: Subject to any disclaimer, the term of this patent is extended or adjusted under 35 U.S.C. 154(b) by 0 days.

(21) Appl. No.: 18/769,265

(22) Filed: Jul. 10, 2024

(30) Foreign Application Priority Data

Mar. 13, 2024 (CN) ........................ 202420488265.X

(51) Int. Cl.
*E06B 9/04* (2006.01)
*E06B 9/00* (2006.01)

(52) U.S. Cl.
CPC .......... *E06B 9/04* (2013.01); *E06B 2009/002* (2013.01)

(58) Field of Classification Search
CPC ........ E06B 2009/002; E06B 9/04; E06B 9/02; E06B 7/32; E06B 11/02; E06B 11/022
See application file for complete search history.

(56) References Cited

U.S. PATENT DOCUMENTS

| | | | | |
|---|---|---|---|---|
| 5,797,218 A * | 8/1998 | Holland | E06B 9/04 49/55 | |
| 7,975,431 B2 * | 7/2011 | Flannery | E06B 7/32 | |
| 9,382,750 B1 * | 7/2016 | Flannery | E05D 15/54 | |
| 9,874,055 B1 * | 1/2018 | Flannery | E06B 3/26 | |
| 11,111,719 B1 * | 9/2021 | Flannery | E06B 11/022 | |
| 11,739,589 B1 * | 8/2023 | Kaiser | E06B 9/04 49/394 | |
| 2006/0175028 A1 * | 8/2006 | Askinasi | E06B 9/02 160/225 | |
| 2009/0293363 A1 * | 12/2009 | Flannery | E06B 7/32 49/55 | |
| 2013/0160365 A1 * | 6/2013 | Flannery | E06B 11/022 49/50 | |
| 2014/0318018 A1 * | 10/2014 | Huang | E06B 9/04 49/386 | |
| 2015/0101250 A1 * | 4/2015 | Marsden | E06B 9/0623 49/55 | |
| 2017/0350165 A1 * | 12/2017 | Schort | E05B 65/0007 | |
| 2018/0112457 A1 * | 4/2018 | Raffi | E05C 19/06 | |
| 2019/0003250 A1 * | 1/2019 | Flannery | E06B 11/02 | |
| 2019/0234139 A1 * | 8/2019 | Flannery | E06B 11/022 | |
| 2023/0203878 A1 * | 6/2023 | Wang | E06B 9/02 160/84.06 | |

* cited by examiner

*Primary Examiner* — Justin B Rephann
(74) *Attorney, Agent, or Firm* — George Tseng; LOZA & LOZA, LLP

(57) ABSTRACT

A barrier system that occupies less space in transportation and reduces the identification and matching time of parts for assembly to improve assembly efficiency. The barrier system includes a door leaf and a frame with a first, second, and third assembly modules. The first assembly module includes a first door leaf subassembly module and a first frame subassembly module that are rotatably connected. The second assembly module includes a second door leaf subassembly module that may be detachably connected with the first door leaf subassembly module to form a door leaf. The third assembly module includes a second frame subassembly module detachably connected with the first frame subassembly module to form a frame. The first, second, and third assembly module are independent of each other when they are not assembled, and together form a barrier system after assembly.

7 Claims, 11 Drawing Sheets

BARRIER SYSTEM WITH INDEPENDENT FENCE AND GATE MODULES

CROSS-REFERENCE TO RELATED APPLICATIONS

This application claims priority to and the benefit of foreign patent application No. 202420488265.X filed at the China National Intellectual Property Administration on Mar. 13, 2024, the entire content of which is incorporated herein by reference.

BACKGROUND

Field

The present disclosure generally relates to interior furniture, and more particularly, to a barrier system with independent fence and gate modules.

Background

Traditionally, fence gates for children and pets, generally referred to as barrier systems, are usually bulky while being shipped. The barrier system occupies a lot of space during transportation. Although in some solutions the barrier system can be disassembled into a plurality of parts and components for packaging and transportation, because of the large number of parts, the subsequent assembly process is inefficient and very inconvenient. Therefore, it is a desirable to have a that requires minimal transportation/shipping space and high assembly efficiency at the same time.

SUMMARY

The following presents a simplified summary of one or more aspects of the disclosed to provide a basic understanding of such aspects. This summary is not an extensive overview of all contemplated features of the disclosure and is intended neither to identify key or critical elements of all aspects of the disclosure nor to delineate the scope of any or all aspects of the disclosure. Instead, its sole purpose is to present some concepts of one or more aspects of the disclosure in a simplified form as a prelude to the more detailed description that is presented later herein.

According to various aspects, the subject innovation relates to providing a. Certain aspects provide a to solve the technical problem of prior art fence gates not being able to be compactly shipped and having a complex assembly processes.

In one aspect, the disclosure provides a barrier system having a first assembly module having a first door leaf subassembly module and a first frame subassembly module that are rotatably connected to each other. The barrier system also includes a second assembly module having a second door leaf subassembly module, wherein the first door leaf subassembly module of the first assembly module and the second door leaf subassembly module are configured as two separable portions of a door leaf such that the two separable portions of the door leaf are separable from each other in a width direction of the barrier system while the second door leaf subassembly module can be detachably connected with the first door leaf subassembly module of the first assembly module in order to form the door leaf. The barrier system further includes a third assembly module having a second frame subassembly module, wherein the first frame subassembly module of the first assembly module and the second frame subassembly module are respectively configured as two separable portions of a frame such that the two separable portions of the frame that are separable from each other in the width direction of the barrier system while the second frame subassembly module are detachably connected with the first frame subassembly module of the first assembly to form the frame, and the door leaf being able to rotatably pass through the frame relative to the first frame subassembly module based on the first door leaf subassembly module and the first frame subassembly module being rotatably connected with each other.

Another aspect of the disclosure provides that the first assembly module, the second assembly module, and the third assembly module are physically independent of and separate from each other when not assembled, and together comprises the barrier system after assembly.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

These and other aspects of the invention will become more fully understood upon a review of the detailed description, which follows.

BRIEF DESCRIPTION OF THE DRAWINGS

So that the manner in which the above-recited features of the present disclosure can be understood in more detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 2 is a perspective view of a plug-in structure that may be used in the barrier system of FIG. 1 configured in accordance with certain aspects of the present disclosure;

FIG. 3 is a perspective view of another plug-in structure that may be used in the barrier system of FIG. 1 configured in accordance with certain aspects of the present disclosure;

To facilitate understanding, identical reference numerals have been used, where possible, to designate identical elements that are common to the figures. It is contemplated that elements disclosed in one aspect may be beneficially used on other aspects without specific recitation.

DETAILED DESCRIPTION

Figure 1:
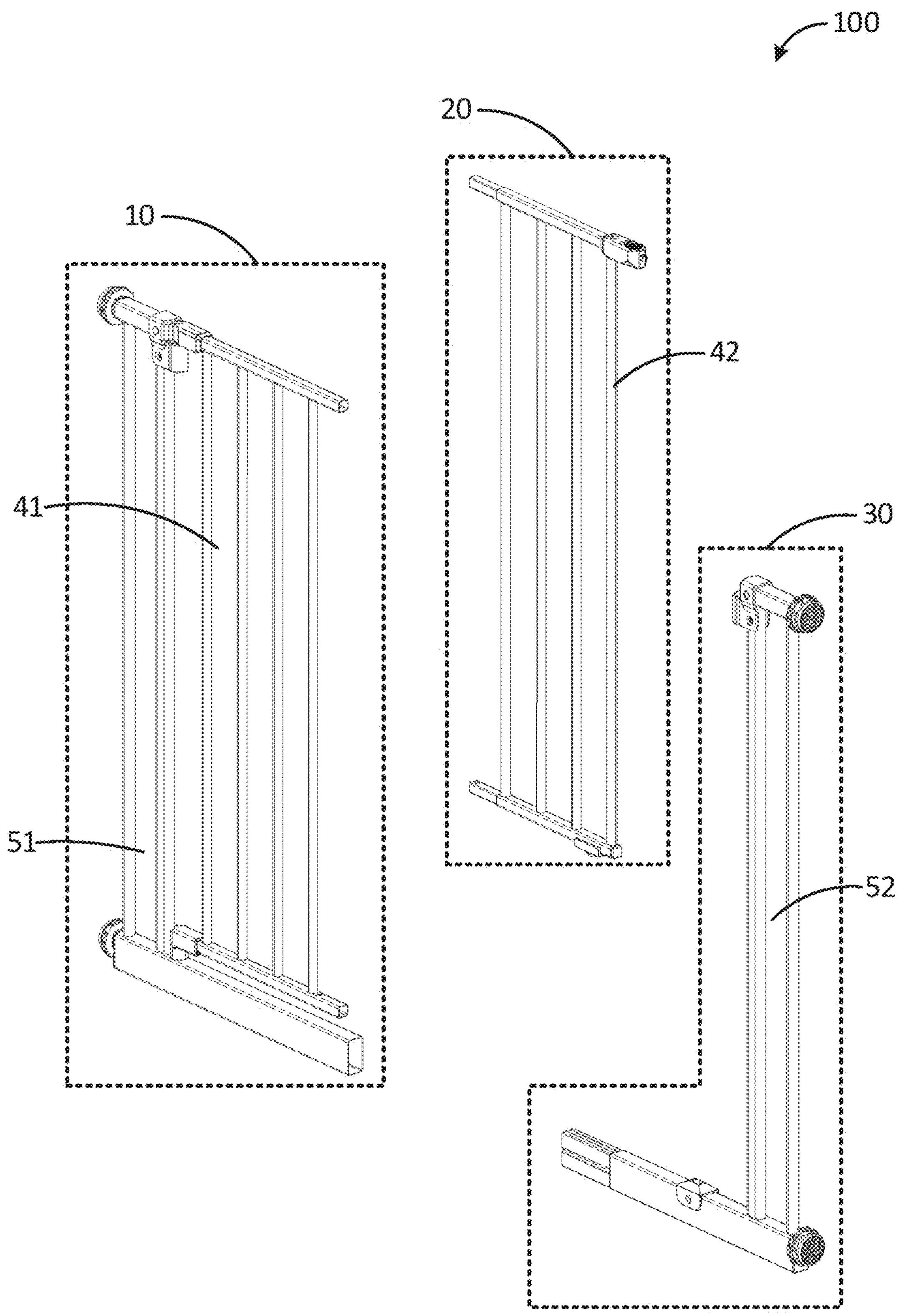
FIG. 1 is a perspective view of various separate assembly modules, before assembly, of a barrier system with independent fence and gate modules configured in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different barriers, some of which are illustrated by way of example in the figures and in the following description of the preferred aspects. The detailed description and drawings are merely illustrative of the disclosure rather than limiting, the scope of the disclosure being defined by the appended claims and equivalents thereof.

It should be noted that when a component is expressed as "connected" or "coupled" to another component, it may refer to that component being directly connected/coupled to the other component or there may be one or more other components in between. In addition, the terms "upper", "lower", "left", "right", "top", and "bottom" relate to the orientation or positional relationship indicated based on the orientation or positional relationship shown in the drawings, and should be understood that they are for the convenience of describing various aspects of the present disclosure and simplifying the description, and does not indicate nor imply that the device or element referred to must have a specific orientation, be constructed and operated in a specific orientation, and therefore should not be construed as a limitation on the present disclosure. Moreover, the terms "first", "second", etc., are used for descriptive purposes only and should not be construed as indicating or implying relative importance. Furthermore, any terms for motion or direction used herein, such as "move", "slide", "press", "in", "out", "clockwise", "counterclockwise", etc., are provided as examples of possible movement or rotation in the described examples and should not be limiting unless otherwise used in the claims.

Unless otherwise defined, all technical and scientific terms used in this specification have the same meanings as generally understood by those skilled in the art of the present disclosure. The terms used in the description of the present disclosure are for the purpose of describing specific embodiments only and are not intended to limit the invention.

The various embodiments of the described herein describes various aspects of a barrier that helps to prevent pets or young children from accessing an area, so as to limit a range of activities of pets or young children and avoid potential safety hazards.

In one aspect of the present disclosure, the barrier system provides a modality for assembly where the main parts of the barrier system may be separated into multiple assembly modules so that each assembly module is independent of each other when unassembled. Moreover, each assembly module is smaller than the overall size of the barrier system as assembled. This modular assembly modality provides benefits such as occupying less space for transportation and allows for reducing the number of subassembly modules that may need to be shipped while also being more efficient for storage. Due to the modular assembly modality and the fewer number of modules, the barrier system of the present disclosure reduces the time needed both for the identification and assembly of parts during the assembly process, thereby also improving the efficiency of assembly of the barrier system. Further, the modules may be optimized such that most elements of the barrier system are pre-assembled such that a consumer is not subjected to a complicated assembly process.

Referring to FIG. 1, a barrier system 100 includes three assembly modules: a first assembly module 10, a second assembly module 20, and a third assembly module 30, each of which are physically independent of each other when not assembled. As further described herein, each assembly module has a width dimension that is less than an overall width dimension of the barrier system 100 as assembled.

Figure 2:
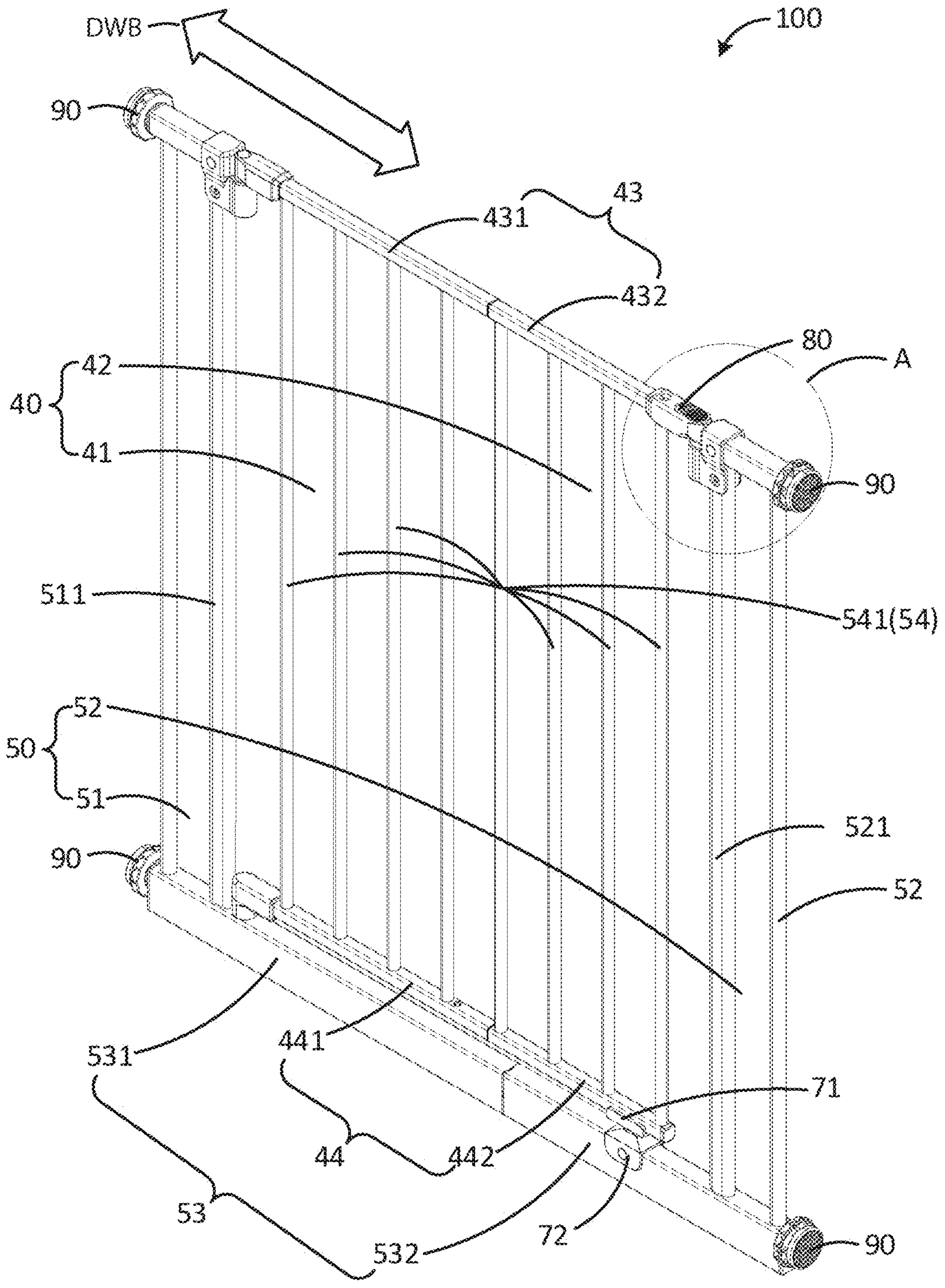
FIG. 2 is a perspective view of the barrier system, as assembled from the separate assembly modules of FIG. 1, configured in accordance with certain aspects of the present disclosure.

Continuing to refer FIG. 1 and further referring to FIG. 2, the first assembly module 10 includes a first door leaf subassembly module 41 and a first frame subassembly module 51 that are rotatably connected with each other. The second assembly module 20 includes a second door leaf subassembly module 42 that may be coupled to the first door leaf subassembly module 41 of the first assembly module 10 to form a door leaf 40. The second door leaf subassembly module 42 may also be detached from the first door leaf subassembly module 41 as necessary to disassemble the door leaf 40. In other words, the first door leaf subassembly module 41 and the second door leaf subassembly module 42 are respectively configured as two separatable portions of the door leaf 40 in a width direction of the barrier system 100 labeled as "DWB", as shown in FIG. 2.

The third assembly module 30 includes a second frame subassembly module 52. The first frame subassembly module 51 and the second frame subassembly module 52 are respectively configured as two separable portions of a frame 50 that may be separated in the direction DWB of the barrier system 100. Specifically, the second frame subassembly module 52 is detachably connected with the first frame subassembly module 51 to form the frame 50.

When fully assembled, the door leaf 40 may rotatably pass through the frame 50. Specifically, the frame 50 is completed when the second frame subassembly module 52 of the third assembly module 30 is coupled to the first frame subassembly module 51 of the first assembly module 10. The door leaf 40 is created when the second door leaf subassembly module 42 is connected to the first door leaf subassembly module 41 in first assembly module 10. Because the first door leaf subassembly module 41 is rotatably connected with the first frame subassembly module 51, the door leaf 40 may rotatably pass through the frame 50.

The first assembly module 10, the second assembly module 20, and the third assembly module 30 are independent of each other when not assembled and form the barrier system 100 together after assembly. In one aspect of the current disclosure, the first assembly module 10, the second assembly module 20, and the third assembly module 30 may be respectively contained in independent containers/boxes and stored separately when not assembled. In another aspect, the first assembly module 10, the second assembly module 20, and the third assembly module 30 may be stored in the same container by being stacked or staggered. as to reduce space occupation in the process of packaging and transportation.

Figure 3:
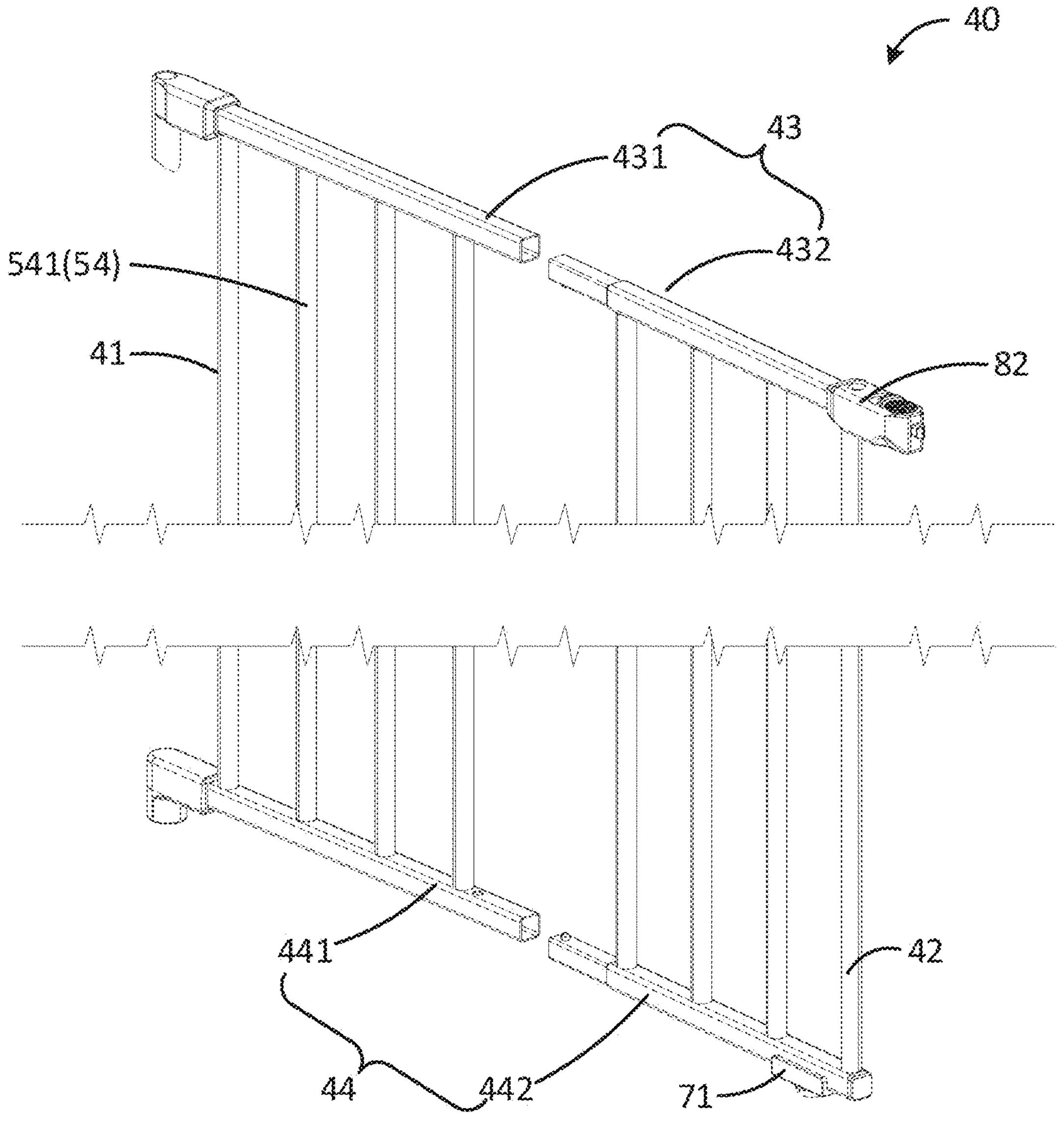
FIG. 3 is a perspective view of a door leaf of the barrier system of FIG. 1 configured in accordance with certain aspects of the present disclosure.

Referring again to FIG. 2 and further referring to FIG. 3, in one aspect of the present disclosure, the door leaf 40 includes an upper door leaf support bar 43 and a lower door leaf support bar 44 at top and bottom portions of the door leaf 40, respectively. In addition, the frame 50 is provided with a bottom frame support bar 53 positioned below the door leaf 40. The upper door leaf support bar 43, the lower door leaf support bar 44, and the bottom frame support bar 53 are provided with corresponding plug-in structures, as further described herein to allow the first door leaf subassembly module 41 to be connected with the second door leaf subassembly module 42. Similarly, the first frame subassembly module 51 may be connected with the second frame subassembly module 52.

It should be understood that the door leaf 40 of the barrier system 100 is provided with the plug-in structure 60*a* for the upper door leaf support bar 43 and the lower door leaf support bar 44 so that the first door leaf subassembly module 41 and the second door leaf subassembly module 42 may be detachably connected through the plug-in structure 60*a*. In addition, the bottom frame support bar 53 is provided with the plug-in structure 60*b* to allow the first door leaf subassembly module 41 and the second door leaf subassembly module 42 may also be detachably connected through a plug-in structure 60*b*. Thus, the first assembly module 10, the second assembly module 20, and the third assembly module 30 may be quickly assembled and disassembled without tools.

For example, the upper door leaf support bar 43, the lower door leaf support bar 44 and the bottom frame support bar 53 all adopt a plug-in structure 60, and the plurality of plug-in structures 60 comprise a first plug-in structure 60, a second plug-in structure 60 and a third plug-in structure 60 corresponding to the upper door leaf support bar 43, the lower door leaf support bar 44 and the bottom frame support bar 53, respectively. The upper door leaf support bar 43 includes a first upper horizontal column split portion 431 arranged on the first door leaf subassembly module 41, and a second upper horizontal column split portion 432 arranged on the second door leaf subassembly module 42. The first upper horizontal column split portion 431 and the second upper horizontal column split portion 432 are connected through the first insertion structure 60 to form an upper door leaf support bar 43.

Correspondingly, the lower door leaf support bar 44 includes a first lower horizontal column split portion 441 arranged on the first door leaf subassembly module 41, and a second lower horizontal column split portion 442 arranged on the second door leaf subassembly module 42, and the first lower horizontal column split portion 441 and the second lower horizontal column split portion 442 are connected through a second insertion structure 60 to form the lower door leaf support bar 44. Further, the bottom frame support bar 53 includes a first bottom horizontal column split portion 531 arranged on the first frame subassembly module 51, and a second bottom horizontal column split 532 arranged on the second frame subassembly module 52, and the first bottom horizontal column split portion 531 and the second bottom horizontal column split portion 532 are connected through the third insertion structure 60 to form the bottom frame support bar 53.

Referring again to FIG. 2 and FIG. 3, in some embodiments, the door leaf 40 further includes a supporting assembly 54 located between the upper door leaf support bar 43 and the lower door leaf support bar 44, and the supporting assembly 54 is connected to the upper door leaf support bar 43 and the lower door leaf support bar 44 respectively. In one embodiment, the support assembly 54 includes a plurality of support rods 541 arranged at intervals, and one end of each support rod 541 is connected to the upper door leaf support bar 43 and another end is connected to the lower door leaf support bar 44. It should be understood that any of the plurality of support rods 541 may be a vertical member or a non-vertical member.

Figure 4:
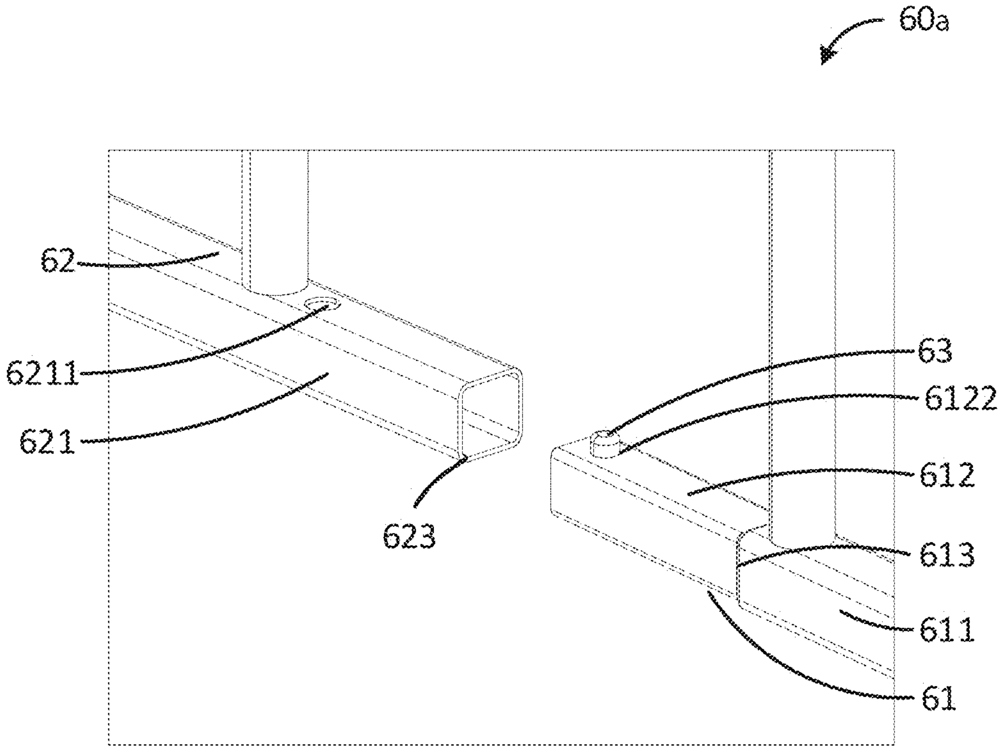
FIG. 4 is a profile view of a support bracket and a support seat of the barrier system of FIG. 1 configured in accordance with certain aspects of the present disclosure.
Figure 5:
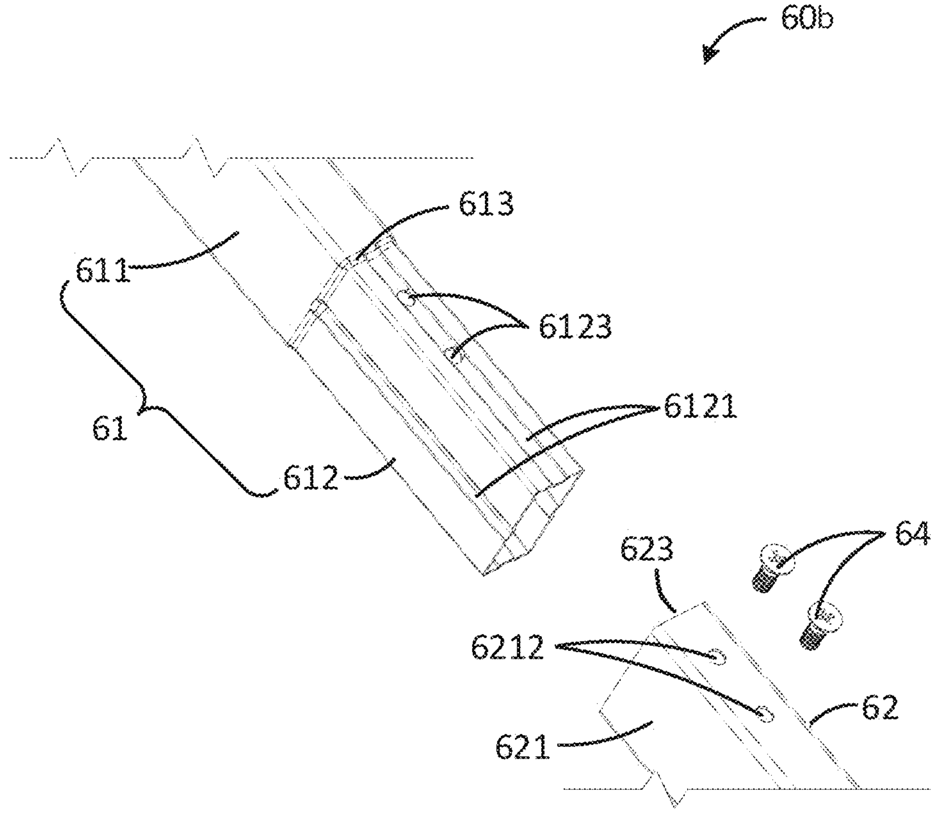
FIG. 5 is a perspective view of the supporting bracket of the barrier system of FIG. 1 configured in accordance with certain aspects of the present disclosure.

Referring to FIG. 4 and FIG. 5, each of the plug-in structures includes a first connecting pipe 61 and a second connecting pipe 62. The first connecting pipe 61 includes a connected main body section 611 and a first insertion section 612, where the first insertion section 612 is located at one end of the first connecting pipe 61 and the junction of the main body section 611 and the first insertion section 612 is provided with a pipe shoulder 613. The main body section 611 has a cross-sectional area that is greater than the cross-sectional area of the first insertion section 612. The second connecting pipe 62 includes a second insertion section 621, where the second insertion section 621 is located at one of two ends of the second connecting pipe 62 and the second insertion section 621 has an inner contour adapted to an outer profile of the first insertion section 612. The first insertion section 612 and the second insertion section 621 are configured to allow the second insertion section 621 to be plugged into the first insertion section 612, such that an end face 623 of the second insertion section 621 is butted against the shoulder 613 of the first connecting pipe 61.

In creating plurality of insertion structures in accordance with various aspects of the present disclosure, each of the upper door leaf support bar 43, the lower door leaf support bar 44 and the bottom frame support bar 53 is provided with two connecting pipes that are connected with each other. For example, the upper door leaf support bar 43 includes a first upper door leaf split portion 431 and a second upper door leaf split portion 432; and the lower door leaf support bar 44 includes a first lower door leaf split portion 441 and a second lower door leaf split portion 442. Similarly, the bottom frame support bar 53 includes a first bottom frame support bar split portion 531 and a second bottom frame support bar split portion 532. When the first connecting pipe 61 is inserted into the second connecting pipe 62, the first insertion section 612 of the first connecting pipe 61 is gradually contained in the second insertion section 621 of the second connecting pipe 62 until the end face 623 of the second insertion section 621 is pressed against the shoulder 613 of the first connecting pipe 61, so that the first connecting pipe 61 and the second connecting pipe 62 may no longer effectively move relative to each other by any significant degree beyond an acceptable tolerance, so that dimensional deviation, as designed, of the door leaf 40 or the frame 50 after assembly is avoided.

The inner contour of the second insertion section 621 is adapted to the outer contour of the first insertion section 612 as described herein refers to one of a transition fit, interference fit, and gap fit adopted by the first insertion section 612 and the second insertion section 621. For example, for the upper door leaf support bar 43, the lower door leaf support bar 44, and the bottom frame support bar 53, the first insertion section 612 and the second insertion section 621 of each support bar may use any one of the mating connections described herein.

In some embodiments, the first connecting pipe 61 is formed from a malleable material, such as a metal-based material, and the pipe body of one end of the first connecting pipe 61 is extruded inward to form a first insertion section 612.

It should be understood that the first connecting pipe 61 and the second connecting pipe 62 of the present disclosure are formed in one piece from a malleable material, such as a metal-based material, and there are no welded joints or connection points, thereby reducing potential points of failure on these structures and improving overall strength and stability of the barrier system 100. In other embodiments, the first connecting pipe 61 and the second connecting pipe 62 may include integrally molded plastic parts, and no restrictions are to be assumed from the description contained herein.

Referring to FIG. 4, in one embodiment the first connection structure 60*a* includes a first spring pin 63 and the first insertion section 612 of the first connecting pipe 61 is provided with a mounting hole 6122, where the first spring pin 63 is exposed through the mounting hole 6122. The second insertion section 621 of the second connecting pipe 62 of the first connecting pipe 61 is provided with a first limiting hole 6211 matched with the first spring pin 63. When the first insertion section 612 is inserted into the second insertion section 621 while the first spring pin 63 is depressed, the first spring pin 63 will be aligned with the first limiting hole 6211 and will penetrate through the first limiting hole 6211.

Specifically, when the first insertion section 612 is inserted into the second insertion section 621, the first spring pin 63 is squeezed into the first insertion section 612 to fit into the second insertion section 621 and follows the first insertion section 612 to continue to move into the second insertion section 621 while resisting the inner contour of the second insertion section 621. When the first spring pin 63 is aligned to the first limiting hole 6211, the first spring pin 63 will spring out through the first limiting hole 6211. Once that occurs, the relative movement of the first insertion section 612 and the second insertion section 621 are restricted such that the first connecting pipe 61 and the second connecting pipe 62 are locked together, and structural stability of the door leaf 40 and the frame 50 is improved. Further, the first spring pin 63, the mounting hole 6122 and the first limiting hole 6211 are configured so that when the first spring pin 63 is aligned with the first limiting hole 621, the end face 623 of the second insertion section 621 is closely abutted against the shoulder 613 of the first connecting pipe 61. Conversely, when the first connecting pipe 61 and the second connecting pipe 62 need to be disconnected from each other, the first spring pin 63 may be pressed inward so that it passes into the first limiting hole 6211 to allow the first insertion section 612 to be withdrawn from the second insertion section 621 such that the first connecting pipe 61 may be separated from the second connecting pipe 62.

Referring to FIG. 5, in another embodiment the second insertion structure 60*b* further includes a set of screws 64, where the first insertion section 612 is provided with a set of threaded openings 6123 matched with the set of screws 64, and the second insertion section 621 is provided with a set of passthrough openings 6212 through which the set of screws 64 may through without being hindered. When the first insertion section 612 is inserted into the second insertion section 621, the set of threaded openings 6123 is aligned with the set of pass-through openings 6212, and each of the set of screws 64 may successively pass through the set of pass-through openings 6212 and be threaded with the set of threaded openings 6123.

Continuing to refer to FIG. 5, it should be understood that the plugging structure 60*b* is provided with the set of threaded openings 6123 on the first insertion section 612; matched to the set of pass-through openings 6212 arranged on the second insertion section 621, such that when the first insertion section 612 is inserted into the second insertion section 621, the set of threaded openings 6123 will slide along inside the second insertion section 621 with the first insertion section 612. Further, when the set of threaded openings 6123 is aligned with the set of pass-through openings 6212 and the set of threaded openings 6123 from the outside, and is connected with the set of threaded openings 6123 to limit the relative activity of the first insertion section 612 and the second insertion section 621, thereby the first connecting pipe 61 and the second connecting pipe 62 are locked, and the structural stability of the door leaf 40 and the frame 50 is improved. In addition, the set of threaded openings 6123 and the set of pass-through openings 6212 are configured in such a way that when the end face 623 of the second insertion section 621 is clearly placed against the shoulder 613 of the first connecting pipe 61, the set of threaded openings 6123 and the set of pass-through openings 6212 are aligned and the screw XX may be inserted through the set of pass-through openings 6212 and threaded in and secured to the set of threaded openings 6123. Correspondingly, when the first connecting pipe 61 and the second connecting pipe 62 need to be separated so that the door leaf 40 and the frame 50 may be disassembled, each of the set of screws 64 is unscrewed, and the first connecting pipe 61 is withdrawn from the second connecting pipe 62 until the first insertion section 612 is separated from the second insertion section 621.

Continuing to refer to FIG. 5, in some embodiments the first insertion section 612 is provided with a set of slots 6121 concaved inwards in a length direction along the first insertion section 612, and the set of slots 6121 is used for producing elastic deformation when the first insertion section 612 is inserted into the second insertion section 621.

It should be understood that, in this embodiment, the set of slots 6121 allow elastic deformation of the first insertion section 612 for easier insertion of the first insertion section 612 into the second insertion section 621. Moreover, after insertion, the set of slots 6121 of the first insertion section 612 will tend to recover from elastic deformation, thereby generating elastic forces to resist the inner contour of the second insertion section 621, and also increasing friction between the first insertion section 612 and the second insertion section 621, and further improving stability of the connection structure **60*b*. Furthermore, the set of slots 6121 on the first insertion section 612 are concave inwards to form grooves, and when the outer contour of the first insertion section 612 is squeezed by the inner contour of the second insertion section 621, each notch of the grooves is narrowed to reduce a cross-sectional size of the first insertion section 612, and after the insertion is completed, it shows a tendency to recover elastic deformation, acting on the inner contour of the second insertion section 621**.

For example, the first connecting pipe 61 and the second connecting pipe 62 are both square pipes, and at least one surface of the first insertion section 612 is provided with the set of slots 6121.

Referring again to FIG. 2, in some embodiments, there is a first preset distance between the lower door leaf support bar 44 of the door leaf 40 and the bottom frame support bar 53 of the frame 50. The first frame subassembly module 51 is provided with a first column 511 most adjacent to the first door leaf subassembly module 41, and a second preset distance is separated between the first column 511 and the first door leaf subassembly module 41. The second frame subassembly module 52 is provided with a second column 521 opposite to the first column 511, the second column 521 being most adjacent to the second door leaf subassembly module 42 when the door leaf 40 is closed, and separated from the second door leaf subassembly module 42 by a third preset distance.

It should be understood that prior art fence doors are only provided with a small gap between the lower door leaf support bar 44 and the bottom support frame bar 53. However, in the process of using the fence door, the pet or the young child may put the limb on the bottom door rail, there is the unexpected situation that others do not perceive the behavior of the pet or the young child and close the door, and at this moment, the door leaf 40 will squeeze or collide with the limb of the pet or the young child when it is closed, and cause injury to the pet or the young child. Correspondingly, the relative activity between the two sides of the door leaf 40 and the frame 50 may also have the same safety problem.

Therefore, in some embodiments, the first preset distance between the lower door leaf support bar 44 of the door leaf 40 and the bottom frame support bar 53 of the frame 50, the second preset distance between the first column 511 of the first frame subassembly module 51 and the first door leaf subassembly module 41, and the third preset distance between the second column 521 of the second frame subassembly module 52 and the second door leaf subassembly module 42 is configured so that, when the door leaf 40 is closed, each edge of the door leaf 40 is located at a safe distance away from the frame 50 and likelihood that any injury caused to the pet or the young child is eliminated or reduced significantly to improve the safety of the barrier system 100.

Figure 6:
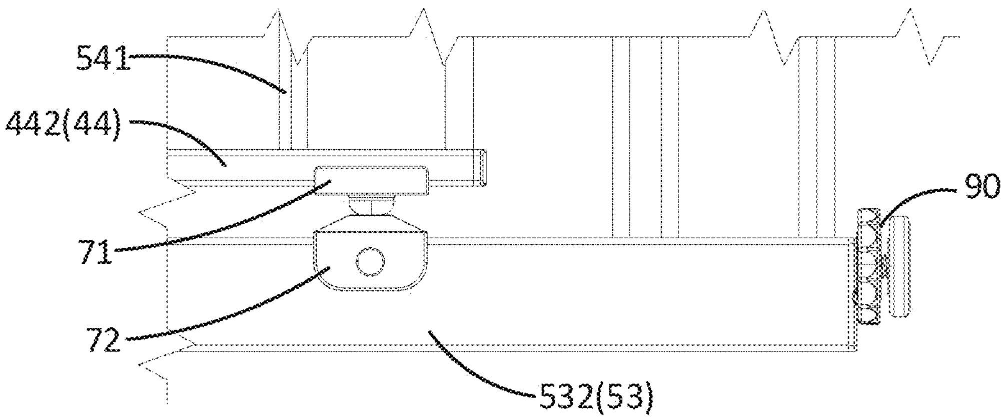
FIG. 6 is a perspective view of the supporting bracket of the barrier system of FIG. 1 configured in accordance with certain aspects of the present disclosure.

Referring to FIG. 6, in some embodiments a bottom portion of the lower door leaf support bar 44 is provided with a support 71 for supporting the door leaf 40, and a top portion of the bottom frame support bar 53 is provided with a support seat 72 matched with the support 71. When the door leaf 40 is closed, the support 71 is aligned with and connected to the support seat 72.

It should be understood that because there is the first preset distance between the lower door leaf support bar 44 of the door leaf 40 and the bottom frame support bar 53 of the frame 50, if the door leaf 40 is subjected to downward force during closing, the rotary junction of the door leaf 40 and the first frame subassembly module 51 (located at one end on the first door leaf subassembly module 41) provides support through the first frame subassembly module 51, and the second door leaf subassembly module 42 of the door leaf 40 is suspended above the bottom frame support bar 53, which will be difficult for the door leaf 40 to maintain stability. To address this, in this embodiment the support 71 is positioned at the bottom portion of the lower door leaf support bar 44, and the support seat 72 is arranged at the top portion of the bottom frame support bar 53, and when the door leaf 40 is closed, the support seat 72 assists to maintain the support 71 in alignment, and assists in supporting the door leaf 40 so that the door leaf 40 is kept stable.

In some embodiments, in order to further improve the ability of the support 71 and the supporting seat 72 to support the door leaf 40, the support 71 is arranged at the bottom of the second lower horizontal column split portion 442 of the second door leaf subassembly module 42 at a sufficient distance away from the first door leaf subassembly module 41, and the supporting seat 72 is arranged at the top of the second bottom horizontal column split portion 532 of the second frame subassembly module 52 is also located at a sufficient distance from the first frame subassembly module 51 that matches the support 71.

Figure 7:
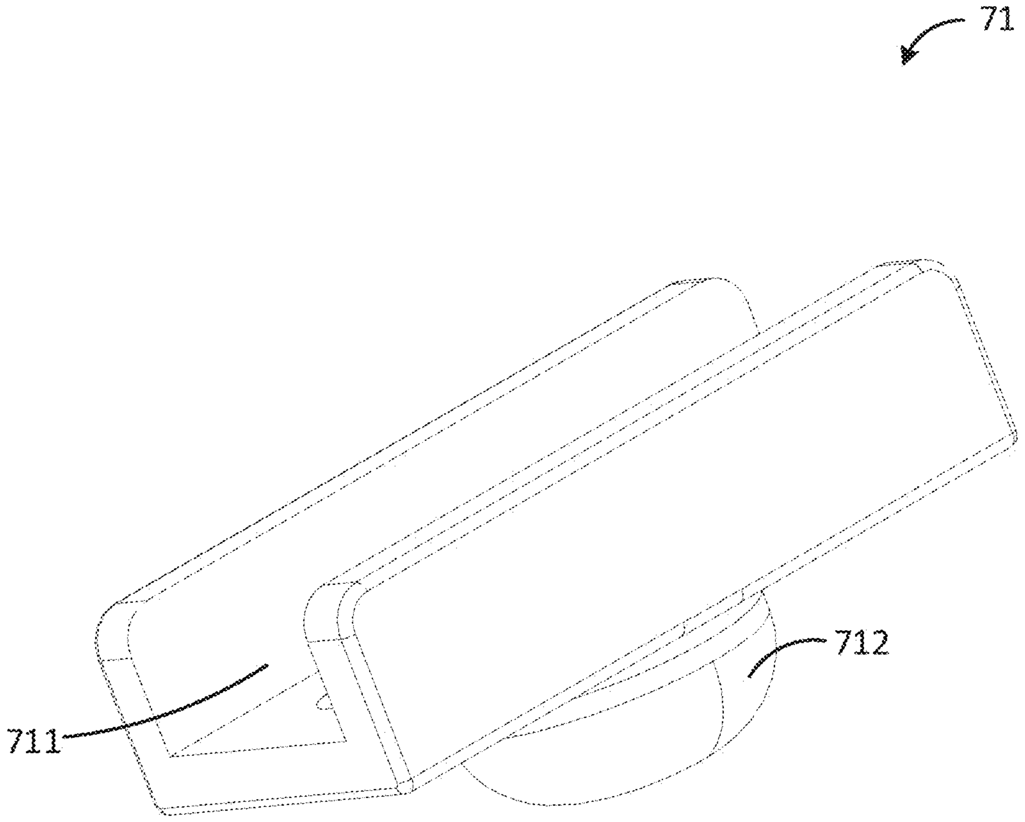
FIG. 7 is a perspective view of an enlarged view of the details of part A in FIG. 2.
Figure 8:
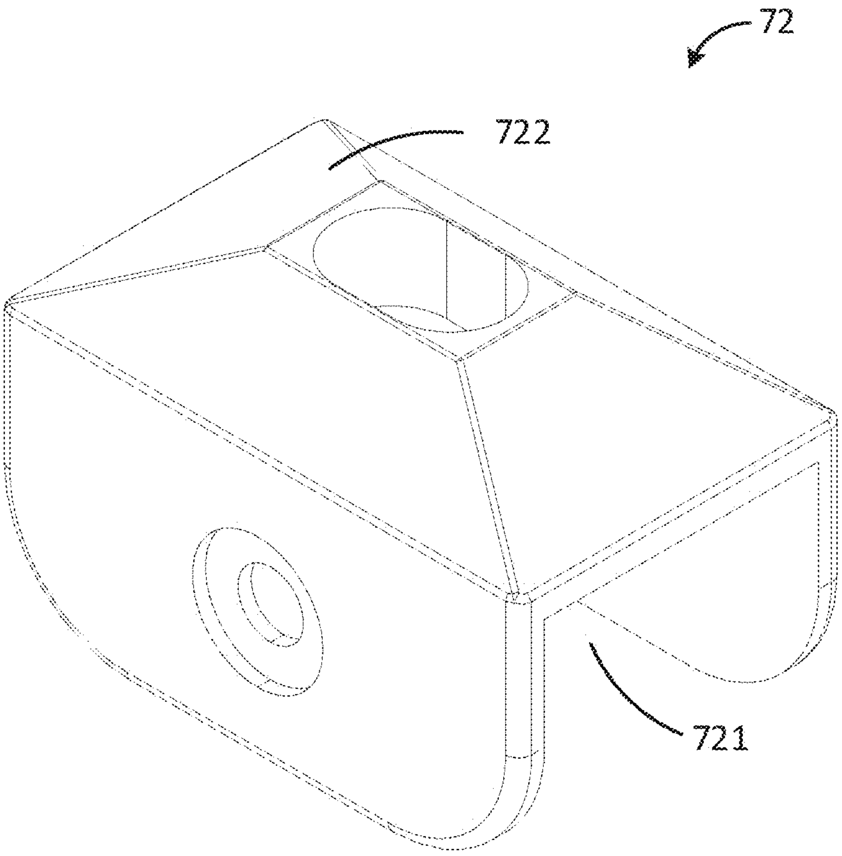
FIG. 8 is a perspective, cut-away, view of a door lock assembly of the barrier system of FIG. 1 configured in accordance with certain aspects of the present disclosure.

Referring to FIG. 7 and FIG. 8, in some embodiments, a top portion of the support bracket 71 is provided with a first groove 711, and a bottom portion is provided with a projection 712, where the first groove 711 is fixedly mounted to the lower door leaf bar 44, and the projection 712 is used for contacting the support seat 72. The support seat 72 is provided with a bevel 722 at a top portion while a bottom portion of the support seat 72 is provided with a second groove 721, where the bevel 722 is used for contacting the support 71 through a flat top portion of the bezel 722, and the second groove 721 is fixedly mounted to the bottom frame support bar 53. When the door leaf 40 is closed, the projection 712 of the support 71 is aligned to the flat top portion of the bezel 722. In addition, the side of the bezel 722 guides the projection 712 against a side of the bezel 722 until reaching the flat top portion of the bezel 722.

In some embodiments, at least one of the bottom portion of the support 71 and the top portion of the supporting seat 72 is provided with a magnet, and the other is provided with a magnetic-friendly material that may be attracted by the magnet. In other embodiments, the bottom portion of the support 71 and the top portion of the supporting seat 72 are respectively provided with magnets of different polarities to attract each other. Through the above-mentioned arrangements, the support 71 and the support seat 72 may be attracted to each other, and any shaking or vibrations that the door leaf 40 produces when closing may be effectively reduced or eliminated.

Figure 14:
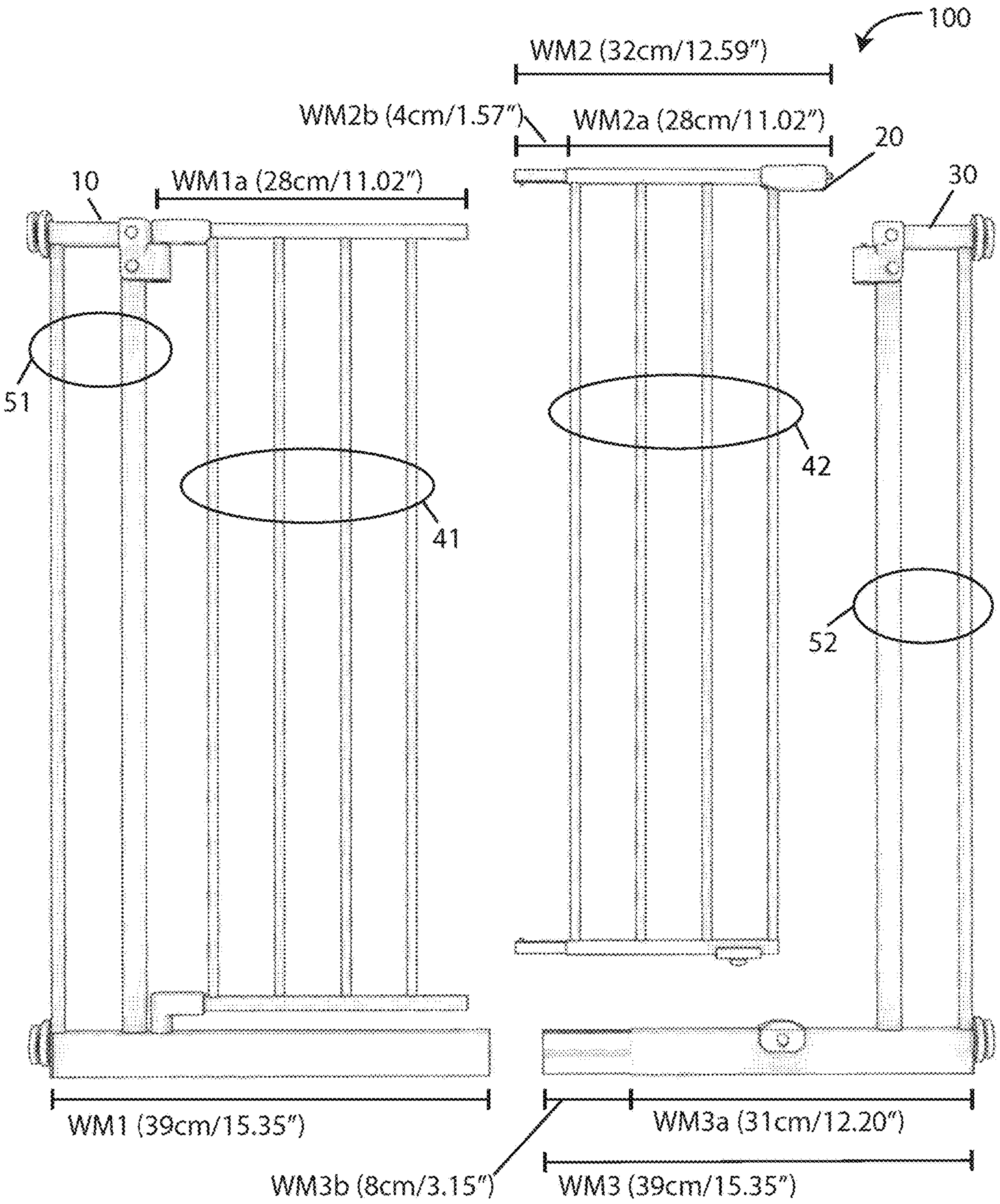
Figure 15:
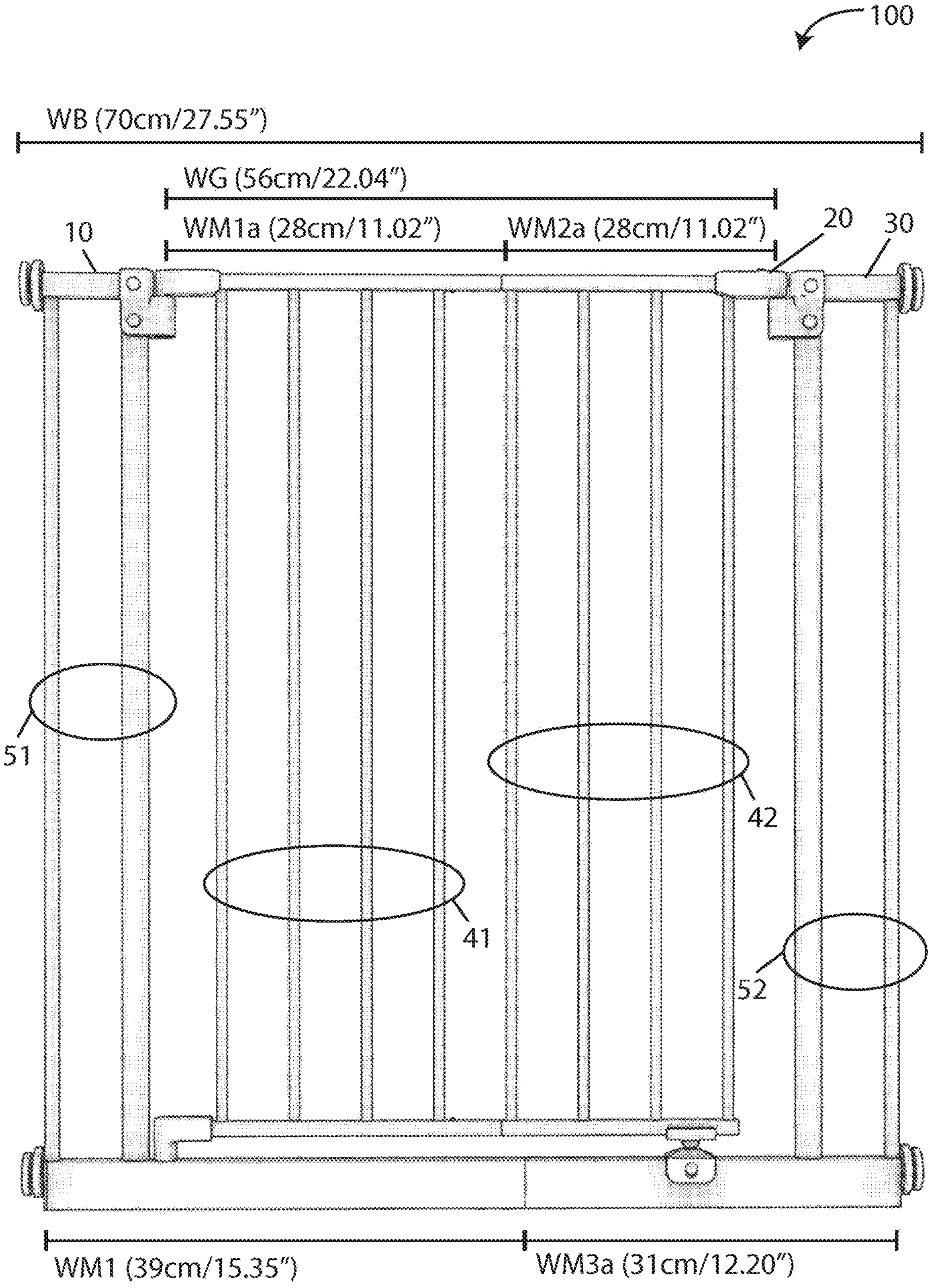

Referring to FIG. 14 and also to FIG. 15, dimensions for various portions of the barrier system 100 are provided to assist in the understanding of various aspects of the present disclosure in accordance with the following table, where all width dimensions are along the direction DWB, as shown in FIG. 2, of the barrier system 100.

TABLE 1

Dimension labels for the barrier system 100.

| Label | Definition |
|---|---|
| WM1 | width of first assembly module 10 |
| WM1a | width of first door leaf subassembly module 41 of first assembly module 10 |
| WM2 | width of second assembly module 20 |
| WM2a | width of second door leaf subassembly module 42 of second assembly module 20 |
| WM2b | width of first insertion section 612 of second door leaf subassembly module 42 of second assembly module 20 |
| WM3 | width of third assembly module 30 |
| WM3a | width of second frame subassembly module 52 of third assembly module 30 |
| WM3b | width of first insertion section 612 of second frame subassembly module 52 of third assembly module 30 |
| WF | width of frame 50, as assembled |
| WG | width of door leaf 40, as assembled |
| WB | width of barrier system 100, as deployed with retainers |

The relationships between the various described widths of the barrier system 100 is provided in the next table.

TABLE 2

Relationships of dimensions in the barrier system 100.

| Dimension | Equation |
|---|---|
| WM2 | WM2a + WM2b |
| WM3 | WM3a + WM3b |
| WF | WM1 + WM3a |
| WG | WM1a + WM2a |

In one embodiment of the current disclosure, the width WM1*a* of the first door leaf subassembly module 41 and the width WM2*a* of the second door leaf subassembly module 42 are each one-half of the width WG of the door leaf 40. The width WM1 of the first frame subassembly module 51 and the width WM3*a* of the second frame subassembly module 52 are each one-half of the width WB of the barrier system 100. In other embodiments, these proportions may be different and multiple combination of widths may be used to achieve various configurations. For example, the width WM1*a* of the first door leaf subassembly module 41 may be one-half of the width WM2*a* of the second door leaf subassembly module 42, both together constitute the width WG of the door leaf 40. In this example, the width WM1*a* is one-third of, and the width WM2*a* is two-third of, the width WG of the door leaf 40. In addition, the width WM1 of the first frame subassembly module 51 and the width WM3*a* of the second frame subassembly module 52 may compose different ratios of the width WB of the barrier system 100, other than one-half of the width WB as described earlier. Thus, no specific ratio for any of the widths described here is required.

Figure 9:
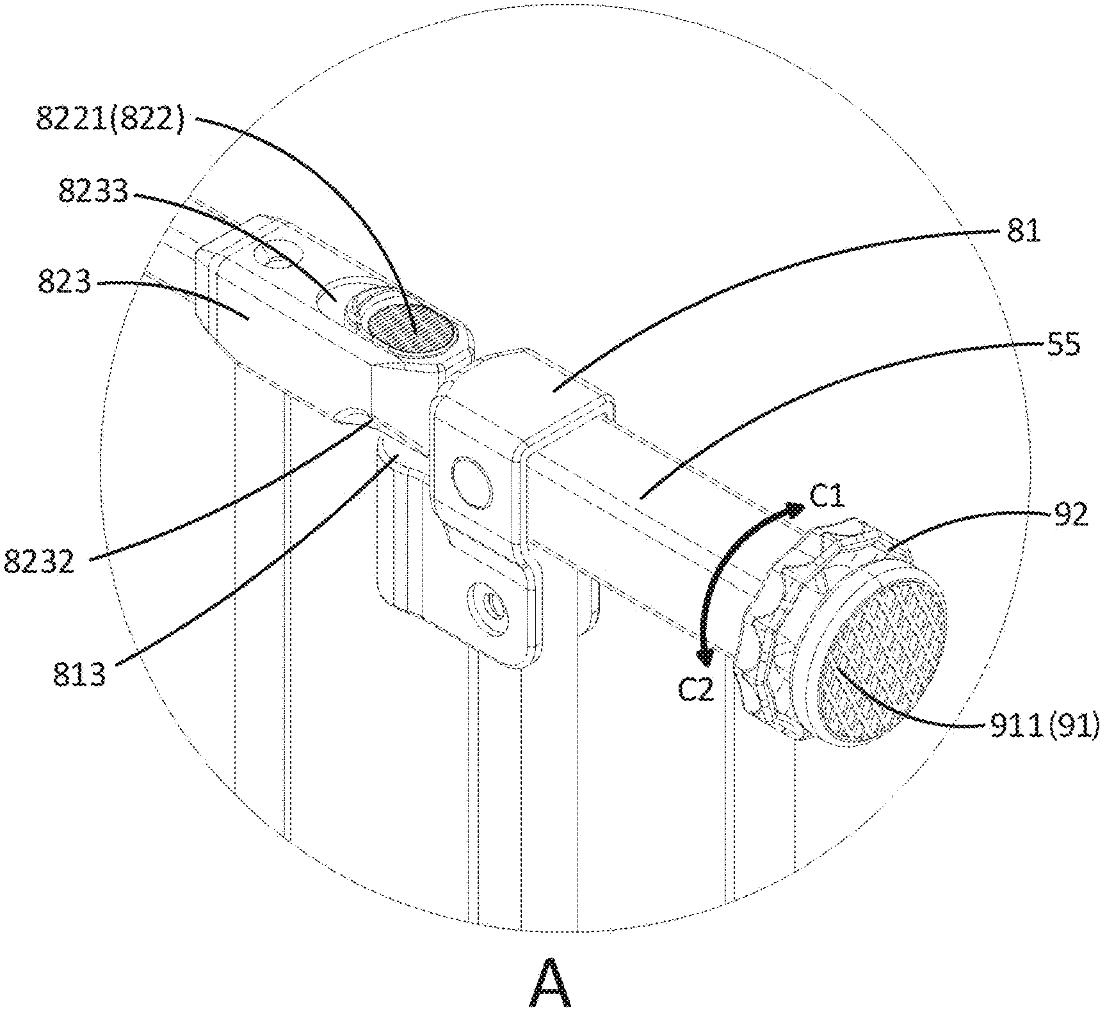
FIG. 9 is a perspective view of a detailed portion of the door lock assembly of the barrier system of FIG. 1 configured in accordance with certain aspects of the present disclosure.
Figure 10:
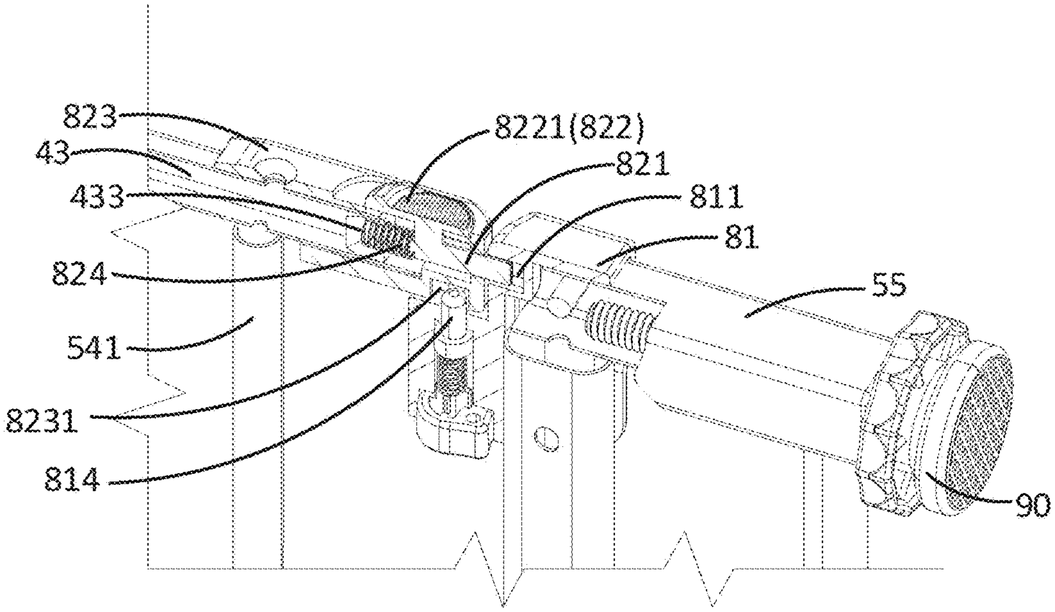
FIG. 10 is a profile view of various assembly modules that make up the barrier system of FIG. 1 illustrating various dimensional references configured in accordance with certain aspects of the present disclosure; and, FIG. 11 is a profile view of the barrier system of FIG. 1, as assembled from the various assembly modules, illustrating various dimensional references in accordance to one aspect of the present disclosure.

Referring to FIG. 9 and FIG. 10, in some embodiments the barrier system 100 includes a door lock assembly 80 having a door latch receiver 81 matched to a door latch 82. The door latch receiver 81 is installed on the second frame subassembly module 52 provided with a keyhole 811. The door latch 82 is installed on the second door leaf subassembly module 42, and the door latch 82 includes a latch 821, and where the latch 821 may preferably be moved relative to the second door leaf subassembly module 42 in a direction of the width WM2*a* of the second door leaf subassembly module 42. The latch 821 is aligned with and partially contained in the keyhole 811 to lock the door leaf 40 to restrict the second leaf subassembly module 42 from moving when the door leaf 40 is closed. Thus, when the door leaf 40 of the present embodiment is closed, the door leaf 40 may be locked by manipulating the door latch 82 so that the latch 821 may be moved within the keyhole 811 to lock the door leaf 40 and preventing rotation of the door leaf 40.

Figure 11:
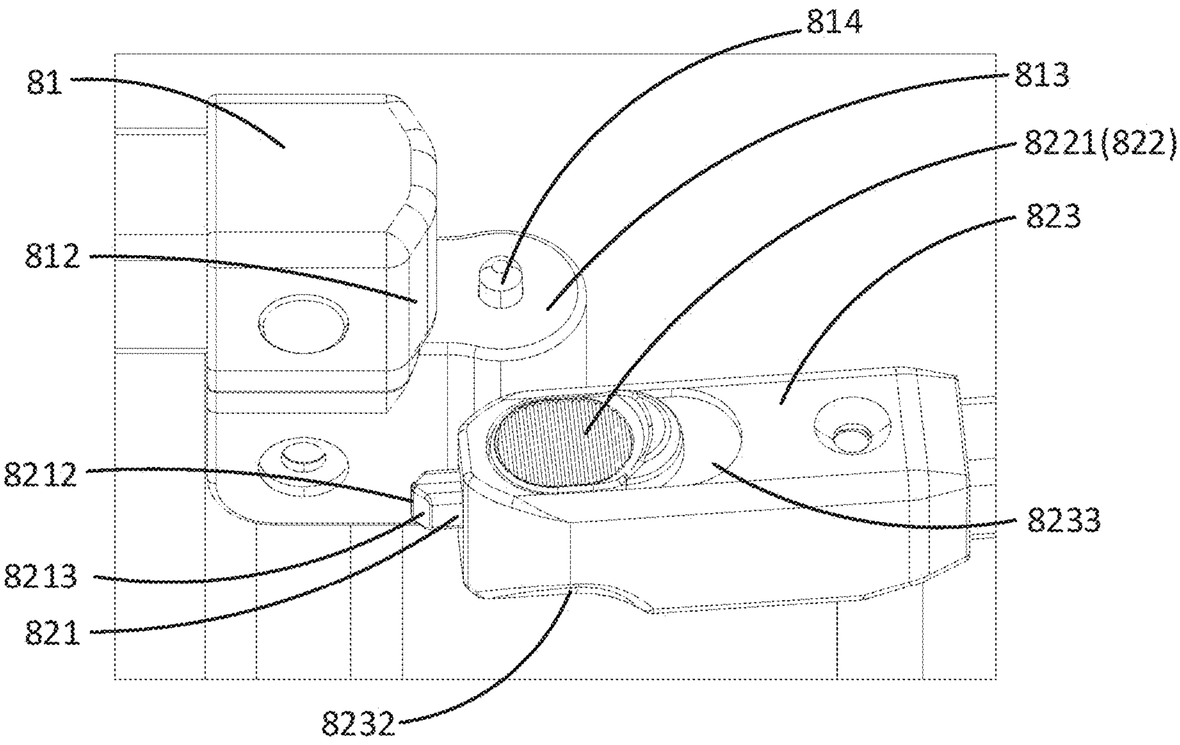

Referring to FIG. 9, FIG. 10 and FIG. 11, in some embodiments the door latch 82 includes a latch housing 823 and a pushing block 822, where the latch housing 823 is provided with a through hole is mounted at one end of the upper door leaf support bar 43 away from the first frame subassembly module 51. The door latch 82 may slide relative to the upper door leaf support bar 43 in a direction along the upper door leaf support bar 43, and one end of the latch 821 is arranged through a hole and suspended on the outside of the latch housing 823 and another end of the latch 821 is contained in the latch housing 823 and the upper door leaf support bar 43. A blocking portion 8211 is connected against an inner wall surface of the latch housing 823 to prevent the latch 821 from being separated from the latch housing 823. The pushing block 822 is connected to the latch 821 and moving pushing block 822 is the same as sliding the latch 821. The pushing block 822 is provided with a pushing portion 8221 located outside of the latching housing 823 that may be pushed by a finger. The latching housing 823 is provided with a reversing groove 8233 on the movable stroke of the part pushing 8221, and when the pushing block 822 is applied to the force on the movable stroke through the pushing portion 8221, the latch 821 will slide. The upper door leaf support bar 43 is provided with a limiting wall 433 that is facing an outer end of the latch 821, and provided with a spring 824 between the outer end of latch 821 and the limiting wall 433, where one end of spring 824 is abutted against the other end of the latch 821, and another end of the spring 824 is abutted against the limiting wall 433. Thereby, when the force acting on the active stroke of the pushing block 822 is released under an elastic force of the spring 824, the latch 821 and pushing block 822 will be reset so that one end of the latch 821 protrudes from latch housing 823.

In one embodiment, the pushing block 822 and the latch 821 are each integral structures formed in one piece.

Figure 12:
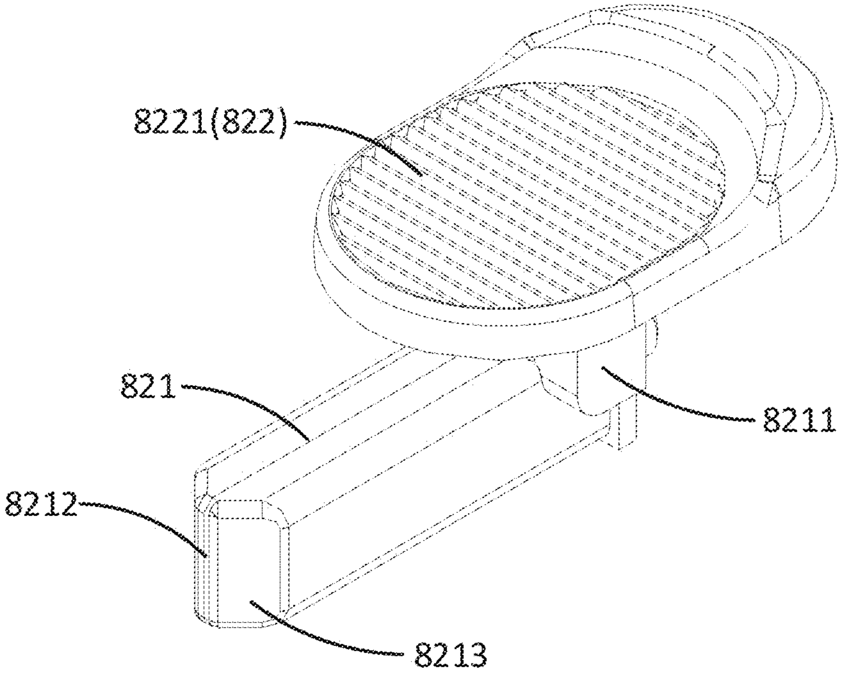
FIG. 12 is a perspective view of a structure of a latch and a pushing block of the barrier system of FIG. 1 configured in accordance with certain aspects of the present disclosure.

Referring to FIG. 11 and FIG. 12, in one embodiment the one end of the latch 821 that is suspended outside the latch housing 823 is provided with a V-shaped structure that includes a ridge 8212 perpendicular to a horizontal plane and a guide inclined plane 8213 that are located on left and right sides of the ridge 8212, respectively. A guide arc surface 812 is matched with the ridge 8212 and the guide inclined plane 8213 is arranged on the door latch receiver 81, and the keyhole 811 is positioned at a middle position of the guide arc surface 812. When the pushing block 822 is not being pushed and the door leaf 40 is intended to be closed, the latch 821 is positioned at one end outside of the latch housing 823 and first contacts the guide arc surface 812 of the door latch receiver 81. Further, the guide inclined plane 8213 contacts and pushes against the guide arc surface 812, and then gradually transitions to contact and pushes against the guide arc surface 812 by the ridge 8212 until the ridge 8212 reaches and extends into the lock groove. It should be understood that when the door leaf 40 is closed, the door leaf 40 may be locked without operating the pushing block 822, so that the operation of the barrier system 100 is more convenient.

Referring to FIG. 10 and FIG. 11, in some embodiments, the door leaf 40 may be lifted to be at a second preset height greater than the preset height relative to the frame 50. The door latch receiver 81 is located at a top portion of the second column 521 and aligned with the latch 821 on the upper door leaf support bar 43, the door latch receiver 81 includes a platform 813 positioned below the keyhole 811. In one aspect of the present disclosure, the platform 813 is provided with an upward second spring pin 814 matched to the door latch 82. The housing 823 is positioned above the platform 813 when the door leaf 40 is closed, and a bottom portion of the latch housing 823 includes a second limiting hole 8231 matched and aligned with the second spring pin 814 when the latch 821 is closed and a part of the second spring pin 814 is contained in the second limiting hole 8231. When the door leaf 40 is raised to the second preset height relative to the frame 50, the second limiting hole 8231 is raised above and separated from the second spring pin 814. The bottom of the latch housing 823 is also provided with an inclined motion arc surface 8232 used for when the door leaf 40 is closed where, by pushing against the second spring pin 814, the second spring pin 814 is retracted to below the latch housing 823 until it is aligned with the second limiting hole 8231.

When the door leaf 40 is moved from an open position to a closed position, the latch housing 823 will move to the top of the platform 813, the latch 821 will be inserted into the keyhole 811, the second spring pin 814 will be aligned with and pushed into the second limiting hole 8231 to restrict the motion of, and lock, the door leaf 40. To open the door leaf 40 from the closed position, the latch 821 is first withdrawn from the keyhole 811 and the door leaf 40 is lifted to detach the second limiting hole 8231 from the second spring pin 814, thereby unlocking the door leaf 40.

It should be understood that the door latch 82 and the door latch receiver 81 are also provided with another component that restricts the motion of the door leaf 40 such that the door leaf 40 is further locked through mutual engagement of the second spring pin 814 and the second limiting hole 8231. Because the unlocking process requires both withdrawing the latch 821 and lifting the door leaf 40 simultaneously, which is difficult for young children and impossible for pets, the safety provided by the barrier system 100 is improved.

Referring to FIG. 2, to secure the barrier system 100, in some embodiments the barrier system 100 includes a plurality of retainers 90 such that each side of the frame 50 has at least two of the plurality of retainers 90. As further described herein, the plurality of retainers 90 are used to affix the frame 50, and thereby the barrier system 100, to the door frame by allowing the frame 50 to push against the door frame in the direction DWB. Operating the plurality of retainers 90 on both sides of the frame 50 simultaneously, the barrier system 100 may be securely connected to the door frame using frictional forces perpendicular to the DWB direction.

In one embodiment, the width WB of the barrier system 100 may be expanded in the direction DWB such that the plurality of retainers 90 on the frame 50 push against the door frame, frictionally attaching the barrier system 100 without having to drill into any surfaces of the door frame. Use of the plurality of retainers 90 allows adjustment of the width WB of the barrier system 100 so that the width WF of the frame 50 is not directly affected by the width of the door frame in which the barrier system 100 is to be installed. Consequently, the width of the door leaf 40, which based on the width WF of the frame 50, is also not directly affected.

Figure 13:
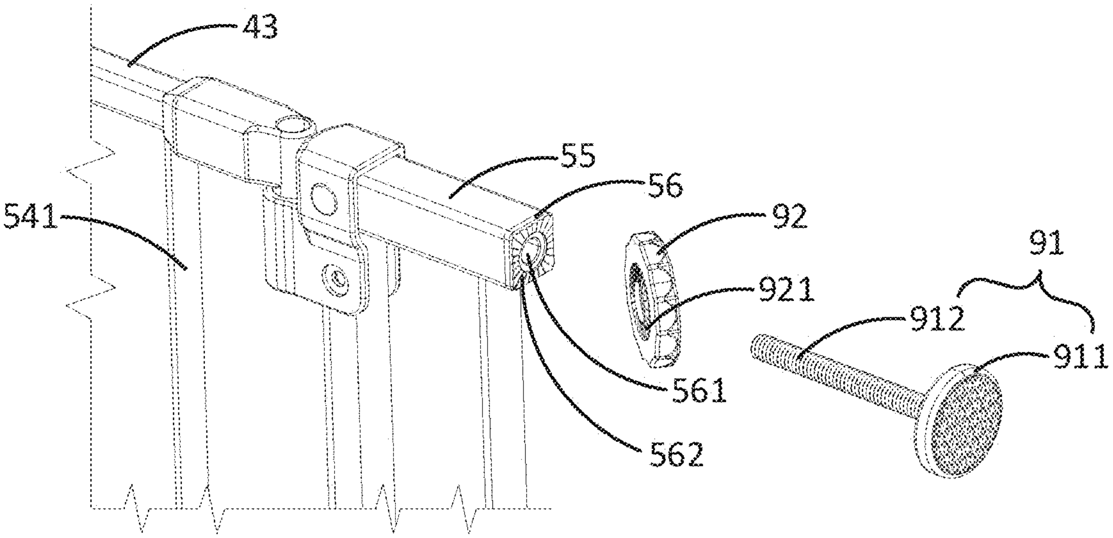
FIG. 13 is a perspective view of a fixer of the barrier system of FIG. 1 configured in accordance with certain aspects of the present disclosure.

Turning now to FIG. 13, in one embodiment, a top portion of the barrier system 100 includes a transverse support pipe 55 on each end of the frame 50. Each transverse support pipe 55 as well as each end of the bottom frame support bar 53 is provided with a pipe plug 56. The pipe plug 56 extends inward along the direction DWB of the barrier system 100 and includes a containment hole 561. The pipe plug 56 is used to support one of the plurality of retainers 90. A description of how the pipe plug 56 interacts with each one the plurality of retainers 90 is provided herein using an example at the transverse support pipe 55 of one of the ends of the top portion of the frame 50. It would be understood by one of ordinary skill in the art that the description may be applied to the use of the pipe plug 56 at the other end of the top portion of the frame 50, as well as to the use of the pipe plug 56 at each end of the bottom frame support bar 53.

Each of the plurality of retainers 90 includes a fixer part 91 and an adjusting nut 92, where the fixer part 91 has a fixer portion 911 and a screw rod 912. One end of the screw rod 912 is connected to the fixer portion 911 such that the fixer portion 911 may rotate relative to the screw rod 912 along a long axis of the screw rod 912. The other end of the screw rod 912 is threaded through and engaged with the adjusting nut 92 to be contained in the containment hole 561 of the pipe plug 56. Depending on how much the screw rod 912 is threaded through the adjustment nut 92, the screw rod 912 will have an exposed portion that is outside of the containment hole 561, with a contained portion remaining in the containment hole 561. In one embodiment, as the adjusting nut 92 is rotated in a clockwise direction, shown as a direction C1 in FIG. 9, the exposed portion of the screw rod 912 that is outside of the containment hole 561 gradually increases. As the exposed portion of the screw rod 912 increases, a distance between the fixer portion 911 and the adjusting nut 92 is further increased in the direction DWB.

As each of the plurality of retainers 90 is adjusted, the width WB of the barrier system 100 may be increased such that each side of the barrier system 100 is pushed against a respective side of the door frame. Preferably, adjusting of the plurality of retainers 90 would be done in pairs associated with each end of the top portion of the frame 50 and each end of the bottom frame support bar 53. For example, the pair of the plurality of retainers 90 on the bottom frame support bar 53 may be adjusted to secure the bottom of the frame 50 before the pair of the plurality of retainers 90 on the top portion of the frame 50 is adjusted. This allows the fixer portion 911 of each respective pair to be pushed against the door frame by extending the exposed portion of the screw rod 912. In addition, because the exposed portion of the screw rod 912 of each one of the plurality of retainers 90 may be adjusted independently, the barrier system 100 may be affixed to door frames that do not have perfectly vertical sides, including door frames that have different widths at different heights. Thus, by adjusting each of the plurality of retainers 90 as described above, the barrier system 100 may be securely affixed to many variations of door frames.

In some embodiments, at least one fixer portion 911 has a planar structure that may abut against door frames that have a flat surface. In other embodiments, at least one fixer portion 911 may have a non-planar structure adapted to be used for door frames that do not have a flat surface. For example, the fixer portion 911 may be adapted for doors frames that use a stop moulding on each side of the door frame.

To remove the barrier system 100 from the door frame after it has been affixed, the adjusting nut 92 may be rotated in a counterclockwise direction, shown as a direction C2 in FIG. 9, which causes the exposed portion of the screw rod 912 that is outside of the containment hole 561 gradually decrease. As the exposed portion of the screw rod 912 decreases, the portion 911 is brought closer to the adjusting nut 92, and further away from the door frame. Once enough of the plurality of retainers 90 have been adjusted such that the width WB of the barrier system 100 is narrower than the door frame, the barrier system 100 can be removed and, if desired, further disassembled. Thus, to secure/remove the barrier system 100 to the door frame, the screw rod 912 of each of the plurality of retainers 90 may be adjusted as necessary to extended/retract from the pipe plug 56 by rotating the adjusting nut 92 in a clockwise/counterclockwise fashion to contact the fixer portion 911 with the door frame.

Continuing to refer to FIG. 13, in some embodiments, an outer end face of the pipe plug 56 is provided with a first end face ratchet 562 while a side portion of the adjusting nut 92 that faces towards the pipe plug 56 is provided with a second end face ratchet 921. The first end face rachet 562 and the second end face ratchet 921 are configured with mirrored teeth patterns that will engage each other when the adjusting nut 92 has been sufficiently rotated a number of turns in a clockwise fashion with respect to the fixer part 91 so as to extend the screw rod 912 such that the fixer portion 911 contacts the door frame, as described above. When the mirrored teeth of the first end face ratchet 562 and the second end face ratchet 921 are sufficiently pressed against each other, the engagement of the mirrored teeth will prevent counterclockwise rotation of the adjusting nut 92 without a great enough counterclockwise rotational force, thereby reducing a possibility of the loosening of the adjusting nut 92.

It should be noted that the above embodiments are only used to illustrate the technical solutions of the present disclosure, not to limit them; under the idea of the present disclosure, the technical features in the above embodiments or different embodiments may also be combined, the steps may be realized in any order, and there are many other variations of different aspects of the present disclosure as above, and they are not provided in detail for the sake of brevity; although the present disclosure is said in detail with reference to the foregoing embodiments, a person skilled in the art should understand that it may still modify the technical solutions said in the foregoing embodiments, or replace some of the technical features therein; and these modifications or substitutions do not make the essence of the corresponding technical solutions out of the scope of the technical solutions of the various embodiments of the present disclosure.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items may be employed by itself, or any combination of two or more of the listed items may be employed. For example, if a composition is described as containing components A, B, and/or C, the composition may contain A alone; B alone; C alone; A and B in combination; A and C in combination; B and C in combination; or A, B, and C in combination.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." For example, the articles "a" and "an" as used in this disclosure and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A barrier system comprising:

a first assembly module having a first door leaf subassembly module and a first frame subassembly module that are rotatably connected to each other;

a second assembly module having a second door leaf subassembly module, wherein the first door leaf subassembly module of the first assembly module and the second door leaf subassembly module are configured as two separable portions of a door leaf such that the two separable portions of the door leaf are separable from each other in a width direction of the barrier system while the second door leaf subassembly module is detachably connected with the first door leaf subassembly module of the first assembly module in order to form the door leaf; and a third assembly module having a second frame subassembly module, wherein the first frame subassembly module of the first assembly module and the second frame subassembly module are respectively configured as two separable portions of a frame such that the two separable portions of the frame that are separable from each other in the width direction of the barrier system while the second frame subassembly module are detachably connected with the first frame subassembly module of the first assembly to form the frame, and the door leaf being able to rotatably pass through the frame relative to the first frame subassembly module based on the first door leaf subassembly module and the first frame subassembly module being rotatably connected with each other;

wherein the first assembly module, the second assembly module, and the third assembly module are physically independent of and separate from each other when not assembled, and together comprises the barrier system after assembly;

wherein the door leaf as assembled comprises an upper door leaf support bar that is positioned at a top portion of the door leaf and a lower door leaf support bar that is positioned at a bottom portion of the door leaf, and the frame as assembled includes a bottom frame support bar that is positioned below the lower door leaf support bar;

wherein the upper door leaf support bar, the lower door leaf support bar and the bottom frame support bar are provided with corresponding plug-in structures, and the first door leaf subassembly module is connected with the second door leaf subassembly module through one of the corresponding plug-in structures, and the first frame subassembly module is connected with the second frame subassembly module through another of the corresponding plug-in structures; and wherein each of the corresponding plug-in structures comprises:

a first connecting pipe having a connected main body section including a connected main body section cross-sectional area and a first insertion section having a first insertion section cross-sectional area, the first insertion section located at one end of the first connecting pipe, wherein a junction between the connected main body section and the first insertion section is provided with a pipe shoulder, and the connecting main body section cross-sectional area is greater than the first insertion section cross-sectional area; and a second connecting pipe having a second insertion section located at one end of the second connecting pipe, the second insertion section including an inner contour adapted to an outer profile of the first insertion section to allow the second insertion section to be coupled to the first insertion section, and an end face of the second insertion section is coupled against the pipe shoulder of the first connecting pipe;

wherein a pipe body of the first insertion section is provided with a deformation zone that is concave inwards in the width direction of the barrier system, and a deformation belt is used for producing elastic deformation when the first insertion section is coupled to the second insertion section.

2. The barrier system of claim 1, wherein the first connecting pipe comprises a malleable material, and a pipe body of one end of the first connecting pipe forms a first insertion section after being extruded inward.

3. The barrier system of claim 1, wherein the first insertion section and the second insertion section both include a pipe body and the pipe body of the first insertion section includes a mounting hole and a first spring pin exposed through the mounting hole, and the pipe body of the second insertion section is provided with a first limiting hole sized to receive the first spring pin;

wherein when the first insertion section is inserted into the second insertion section, the first spring pin is aligned with the first limiting hole and penetrates the first limiting hole.

4. The barrier system of claim 1, wherein each of the corresponding plug-in structures further comprises a threaded fastener with a screw thread and the first insertion section includes a threaded receiver opening with threads matched to engage the screw thread of the threaded fastener, and the second insertion section is provided with an opening with a diameter sized to allow the screw thread of the threaded fastener to pass through the opening;

wherein when the first insertion section is inserted into the second insertion section, the threaded receiver opening is aligned with the opening to allow the screw thread of the threaded fastener to pass through the opening and to be threaded in and secured to the threaded receiver opening.

5. The barrier system of claim 1, wherein a bottom portion of the lower door leaf support bar includes a support bracket that is used for supporting the door leaf, and a top portion of the bottom frame support bar includes a support seat, wherein the support bracket and the support seat have matching contours to allow alignment of the support bracket to the support seat; and wherein when the door leaf is closed, the support bracket is aligned with and connected with the support seat.

6. The barrier system of claim 1, further comprising a door lock assembly comprising:

a door latch receiver installed on the second frame subassembly module, the door latch receiver having a keyhole; and a door latch matched with the door latch receiver, the door latch installed on the second door leaf subassembly module, the door latch comprising a latch that can move relative to the second door leaf subassembly module in a width direction of the second door leaf subassembly module;

wherein the door latch is used to prevent the door leaf from rotating relative to the first frame subassembly module when the door latch is in a first position and allow the door leaf to rotate relative to the first frame subassembly module when the door latch is in a second position, where in the first position the door latch is aligned with the keyhole and is partially contained in the keyhole to lock the door leaf, and where in the second position the door latch is disengaged from the keyhole to allow the door leaf to rotate.

7. The barrier system of claim 1, further comprising at least two fixers, the at least two fixers being respectively installed at two ends of the frame in the width direction of the frame, the at least two fixers are used for connecting the door frame to an external structure, and the frame is fixed to the external structure by the at least two fixers pushing against the door frame and the external structure.

* * * * *